United States Patent
Huang et al.

(10) Patent No.: US 10,723,020 B2
(45) Date of Patent: Jul. 28, 2020

(54) ROBOTIC ARM PROCESSING METHOD AND SYSTEM BASED ON 3D IMAGE

(71) Applicant: UTECHZONE CO., LTD., New Taipei (TW)

(72) Inventors: Hsiao-Wei Huang, New Taipei (TW); Po-Tsung Lin, New Taipei (TW); Chia-Chun Tsou, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 366 days.

(21) Appl. No.: 15/942,571

(22) Filed: Apr. 2, 2018

(65) Prior Publication Data
US 2019/0054617 A1  Feb. 21, 2019

(30) Foreign Application Priority Data

Aug. 15, 2017 (TW) .............................. 106127687 A

(51) Int. Cl.
*B25J 9/16* (2006.01)
*B25J 11/00* (2006.01)
*B29C 65/52* (2006.01)
*B29C 65/00* (2006.01)
*F16B 11/00* (2006.01)
*A63B 53/04* (2015.01)

(52) U.S. Cl.
CPC .............. *B25J 9/163* (2013.01); *B25J 9/1697* (2013.01); *B25J 11/0075* (2013.01); *B29C 65/52* (2013.01); *B29C 66/863* (2013.01); *B29C 66/90* (2013.01); *A63B 53/0466* (2013.01); *F16B 11/006* (2013.01); *G05B 2219/39391* (2013.01); *G05B 2219/40323* (2013.01); *Y10S 901/09* (2013.01); *Y10S 901/41* (2013.01); *Y10S 901/47* (2013.01)

(58) Field of Classification Search
USPC .................................................. 700/245-264
See application file for complete search history.

(56) References Cited

U.S. PATENT DOCUMENTS

| | | | |
|---|---|---|---|
| 6,421,048 B1 * | 7/2002 | Shih ........................ | G06F 3/016 345/419 |
| 6,552,722 B1 * | 4/2003 | Shih ........................ | G06F 3/016 345/419 |

(Continued)

*Primary Examiner* — Jonathan L Sample
(74) *Attorney, Agent, or Firm* — JCIPRNET

(57) ABSTRACT

Robotic arm processing method and system based on 3D image are provided. The processing method includes: providing robotic arm 3D model data and processing environment 3D model data; obtaining workpiece 3D model data, and generating a processing path consisting of contact points according to the workpiece 3D model data, wherein a free end of a robotic arm moves along the processing path to complete a processing procedure; generating a posture candidate group according to a relationship according to each one of the contact points corresponding to the free end of the robotic arm; selecting an actual moving posture from the posture candidate group; moving the free end of the robotic arm to each corresponding one of the contact points according to the selected actual moving posture; and moving the free end of the robotic arm along the processing path according to the actual moving postures to perform the processing procedure.

23 Claims, 8 Drawing Sheets

(56) References Cited

U.S. PATENT DOCUMENTS

| | | | | |
|---|---|---|---|---|
| 6,812,665 B2* | 11/2004 | Gan | ............ | B25J 9/1692 318/568.11 |
| 7,168,935 B1* | 1/2007 | Taminger | ............ | B29C 64/141 425/174.4 |
| 7,298,385 B2* | 11/2007 | Kazi | ............ | B25J 9/1671 345/633 |
| 9,102,055 B1* | 8/2015 | Konolige | ............ | B25J 9/1671 |
| 9,486,921 B1* | 11/2016 | Straszheim | ............ | B25J 9/1687 |
| 9,561,941 B1* | 2/2017 | Watts | ............ | B66F 9/063 |
| 9,687,983 B1* | 6/2017 | Prats | ............ | B25J 9/1612 |
| 10,060,857 B1* | 8/2018 | Bouchard | ............ | G01S 7/4815 |
| 2003/0120391 A1* | 6/2003 | Saito | ............ | B25J 9/1671 700/264 |
| 2003/0200042 A1* | 10/2003 | Gan | ............ | B25J 9/1692 702/105 |
| 2004/0189631 A1* | 9/2004 | Kazi | ............ | B25J 9/1671 345/418 |
| 2006/0111811 A1* | 5/2006 | Okamoto | ............ | B25J 9/0003 700/214 |
| 2007/0010913 A1* | 1/2007 | Miyamoto | ............ | B25J 9/1658 700/264 |
| 2007/0177011 A1* | 8/2007 | Lewin | ............ | B62D 15/0285 348/118 |
| 2009/0208094 A1* | 8/2009 | Hattori | ............ | B25J 9/1697 382/153 |
| 2010/0085358 A1* | 4/2010 | Wegbreit | ............ | G06T 19/20 345/420 |
| 2010/0179689 A1* | 7/2010 | Lin | ............ | G05B 19/4202 700/250 |
| 2010/0296724 A1* | 11/2010 | Chang | ............ | G06T 7/75 382/154 |
| 2011/0288667 A1* | 11/2011 | Noda | ............ | G05B 19/42 700/98 |
| 2012/0220194 A1* | 8/2012 | Maloney | ............ | B24B 37/04 451/5 |
| 2012/0265341 A1* | 10/2012 | Trompeter | ............ | B25J 9/1692 700/254 |
| 2014/0088746 A1* | 3/2014 | Maloney | ............ | G05B 19/4099 700/97 |
| 2015/0379894 A1* | 12/2015 | Becker | ............ | B23K 9/0953 219/124.1 |
| 2016/0016311 A1* | 1/2016 | Konolige | ............ | B25J 9/1612 700/245 |
| 2016/0016317 A1* | 1/2016 | Trompeter | ............ | B25J 9/1692 700/254 |
| 2016/0059412 A1* | 3/2016 | Oleynik | ............ | B25J 13/02 700/257 |
| 2016/0059413 A1* | 3/2016 | Ogata | ............ | B25J 9/1676 700/186 |
| 2016/0136808 A1* | 5/2016 | Konolige | ............ | B25J 5/007 700/214 |
| 2016/0210882 A1* | 7/2016 | Gulasy | ............ | A61B 34/10 |
| 2016/0297068 A1* | 10/2016 | Thibodeau | ............ | G05B 19/408 |
| 2016/0327383 A1* | 11/2016 | Becker | ............ | G01B 11/005 |
| 2017/0348854 A1* | 12/2017 | Oleynik | ............ | A47J 47/02 |
| 2018/0084242 A1* | 3/2018 | Rublee | ............ | G06T 19/003 |

\* cited by examiner

ROBOTIC ARM PROCESSING METHOD AND SYSTEM BASED ON 3D IMAGE

CROSS-REFERENCE TO RELATED APPLICATION

This application claims the priority benefit of Taiwan application serial no. 106127687, filed on Aug. 15, 2017. The entirety of the above-mentioned patent application is hereby incorporated by reference herein and made a part of this specification.

BACKGROUND OF THE INVENTION

Field of the Invention

The invention relates to a processing method and a processing system and more particularly relates to a robotic arm processing method and a robotic arm processing system based on a three dimensional (3D) image.

Description of Related Art

Many processing steps in the OEM industry are single and repetitive. Now manpower is gradually replaced by robots, and more and more machines are used to help improve product yield and reduce labor costs. Besides, the processing paths may be controlled through programs to minimize the uncertainty resulting from manpower processing. Hence, machine processing has become a better option for production of various products.

In terms of the existing machine processing, the processing path for dispensing processing equipment, for example, is usually designed by engineers. If the processing path is simple, such as linear movement or rotation by one single angle, the design of the program for such processing path is simple. However, for a complicated processing path, such as movement of an irregular arc or pattern, the processing path program will be difficult to design.

In addition, when a processing machine carries out processing, generally the workpiece is moved to a processing position through control over a robotic arm. However, if the tolerable tolerance in manufacturing causes identical workpieces to be slightly different from one another, or if the robotic arm causes the workpiece to deviate in distance or angle with respect to the robotic arm when picking up the workpiece, the processing result will be affected.

SUMMARY OF THE INVENTION

The invention provides a robotic arm processing method and a robotic arm processing system based on a 3D image for improving the assembly yield.

The invention provides a robotic arm processing method based on a 3D image, by which a robotic arm performs a processing procedure to at least one workpiece in a processing environment. The processing method at least includes: providing 3D model data of the robotic arm and 3D model data of the processing environment; obtaining 3D model data of the workpiece, and generating a processing path consisting of a plurality of contact points according to the 3D model data of the workpiece, wherein a free end of the robotic arm moves along the processing path to perform the processing procedure;

generating a moving posture candidate group of the robotic arm according to a relationship according to each one of the contact points corresponding to the free end of the robotic arm; selecting an actual moving posture from the moving posture candidate group; moving the free end of the robotic arm to each corresponding one of the contact points according to the actual moving posture; and moving the free end of the robotic arm along the processing path according to a plurality of actual moving postures to perform the processing procedure.

The invention further provides a robotic arm processing system based on a 3D image, which includes: a robotic arm performing a processing procedure to at least one workpiece in a processing environment; a database storing 3D model data of the workpiece, 3D model data of the robotic arm, and 3D model data of the processing environment; and a processing module coupled between the robotic arm and the database to control the robotic arm to execute the processing procedure, wherein the processing module generates a processing path consisting of a plurality of contact points according to the 3D model data of the workpiece, and controls a free end of the robotic arm to move along the processing path to perform the processing procedure; wherein the processing module generates a moving posture candidate group of the robotic arm according to a relationship according to each one of the contact points corresponding to the free end of the robotic arm, and selects an actual moving posture from the moving posture candidate group; wherein the processing module controls the free end of the robotic arm to move to each corresponding one of the contact points according to the actual moving posture; and wherein the processing module controls the free end of the robotic arm to move along the processing path according to a plurality of actual moving postures to perform the processing procedure.

Based on the above, the robotic arm processing method and system based on 3D image, provided according to the invention, make it possible to perform an automated processing procedure, which not only saves manpower but also reduces human errors to improve the assembly yield.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The invention provides robotic arm processing method and system based on 3D image, by which data, such as the processing environment and processing equipment in the real world, is inputted to a database to establish a virtual 3D space, and the virtual 3D space and the real world are corrected, and after 3D data of a workpiece that is to be processed in the real world is obtained, the 3D data of the workpiece to be processed in the real world is inputted to the database and calculated to be coordinated with the processing equipment and processing environment in the virtual 3D space to generate a processing path, such that a robotic arm in the real world is able to carry out the processing procedure in the real world along the processing path calculated in the virtual 3D space.

First Embodiment

Figure 1A:
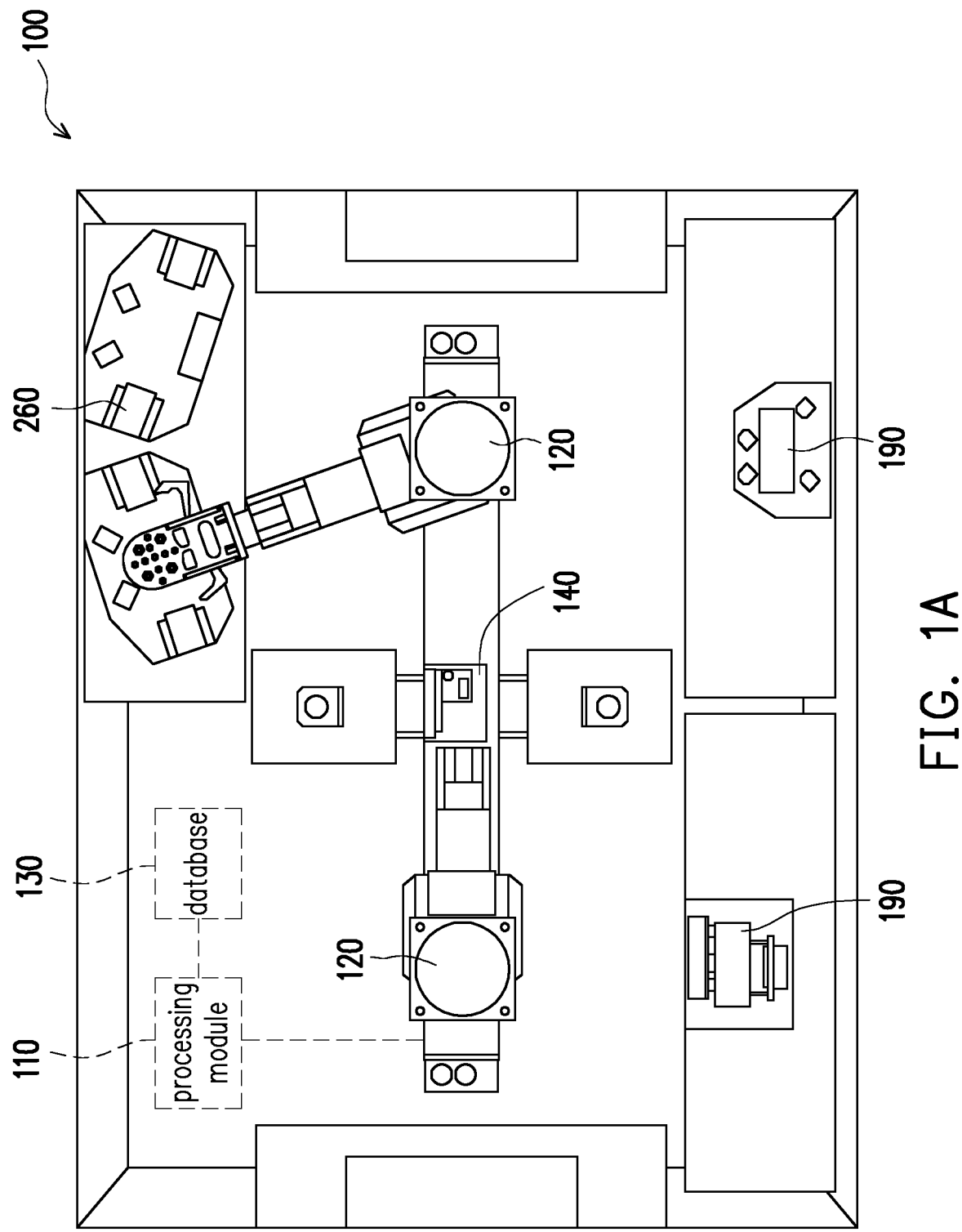
FIG. 1A is a schematic diagram of a robotic arm processing system based on a 3D image according to the first embodiment.
Figure 1B:
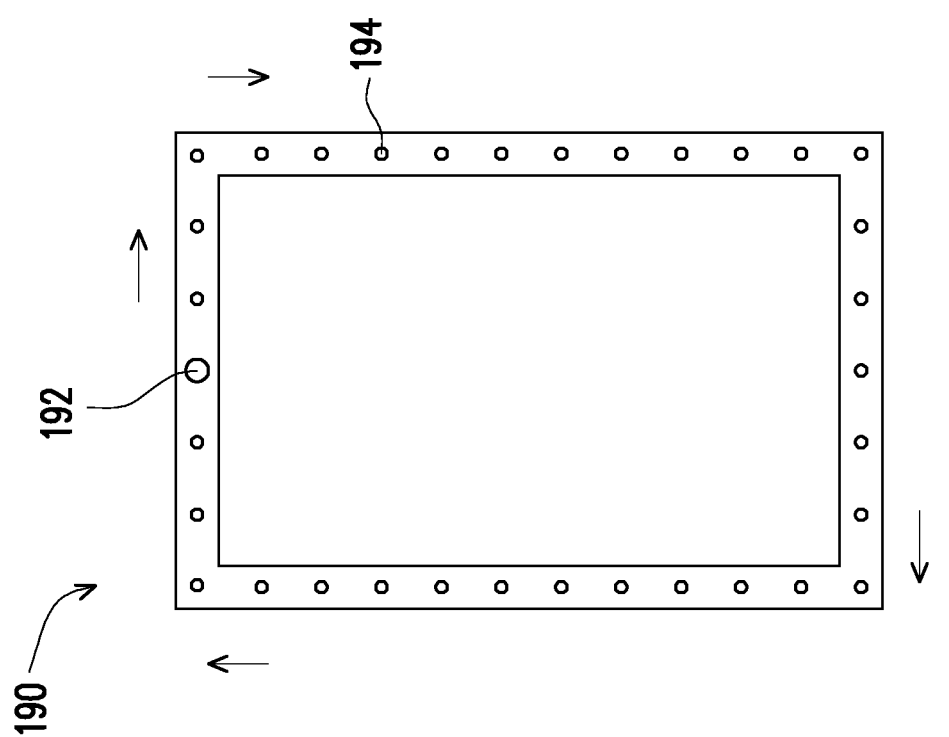
FIG. 1B is a schematic diagram of a processing path consisting of contact points according to the first embodiment.
Figure 2:
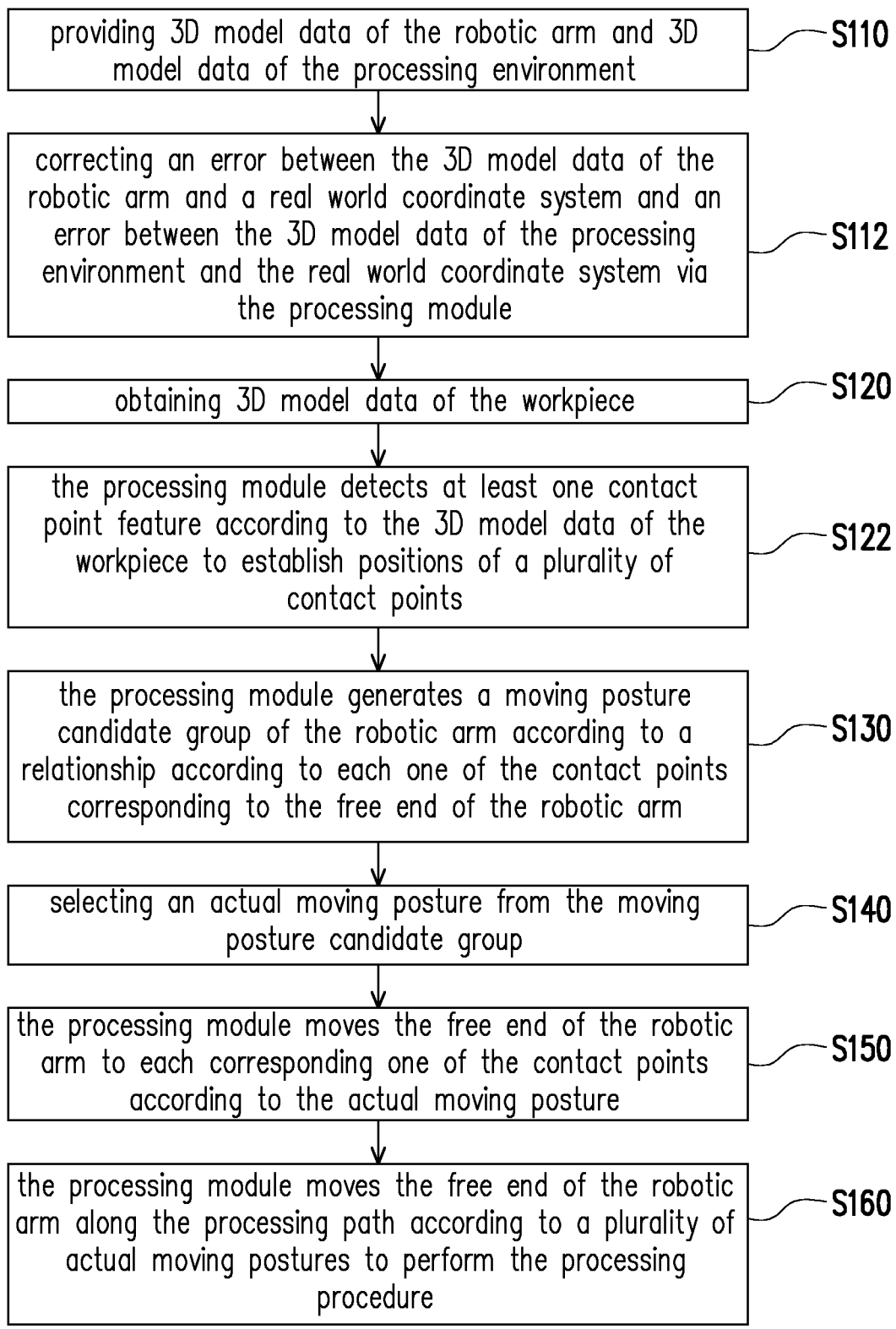
FIG. 2 is a flowchart of a robotic arm processing method based on a 3D image according to the first embodiment.

FIG. 1A is a schematic diagram of a robotic arm processing system based on a 3D image according to the first embodiment. FIG. 1B is a schematic diagram of a processing path consisting of contact points according to the first embodiment. FIG. 2 is a flowchart of a robotic arm processing method based on a 3D image according to the first embodiment. Referring to FIG. 1A, FIG. 1B, and FIG. 2, a robotic arm processing system 100 based on a 3D image includes a processing module 110, a robotic arm 120, and a database 130. The robotic arm 120 is adapted to perform a processing procedure to at least one workpiece 190 in a processing environment; the database 130 is adapted to store 3D model data of the workpiece 190, 3D model data of the robotic arm 120, and 3D model data of the processing environment; and the processing module 110 is electrically coupled between the robotic arm 120 and the database 130 to control the robotic arm 120 to execute the processing procedure.

The processing module 110 and the database 130 may be built in the same electronic device (e.g., a computer host), or the database 130 and the processing module 110 may be independent of each other. For example, the database 130 may be a portable hard drive, and the portable hard drive may be electrically connected to the processing module 110 via a medium.

When the processing system is used to process the workpiece 190, at least the following Step S110 to Step S160 are included.

For example, in Step S110, 3D model data of the robotic arm 120 and 3D model data of the processing environment are provided.

For example, in Step S120, 3D model data of the workpiece 190 is obtained, wherein the obtained 3D model data of the workpiece 190 may be preset 3D model data of the workpiece 190 that the processing module 110 obtains via the database 130, or 3D model data of the workpiece 190 that is generated by detecting the contour and size of the workpiece 190 via a non-contact type detection device 140. The workpiece 190 may be a housing of any device (including an electronic device or a non-electronic device) or a housing of a golf club head. Any article that requires processing may be the workpiece for the processing system or the processing method, and is not limited to the examples mentioned in this embodiment. In this embodiment, the workpiece 190 is a housing of an electronic device. The housing of the electronic device is rectangular and a surface to be processed is a flat surface. In addition, a method of detecting the workpiece 190 via the non-contact type detection device 140 may be capturing an image of the workpiece 190 with a depth camera, scanning the contour of the workpiece 190 by 3D laser scanning, or using both the depth camera and 3D laser scanning. Certainly, the method of detecting the workpiece 190 via the non-contact type detection device 140 is not limited to the examples mentioned in this embodiment, and those skilled in the art may choose a suitable method according to the actual needs.

It should be noted that Step S112 may be further included between Step S110 and Step S120, in which an error between the 3D model data of the robotic arm 120 and a real world coordinate system and an error between the 3D model data of the processing environment and the real world coordinate system are corrected via the processing module 110.

The correction means that the processing module 110 selects at least one correction point position data from the 3D model data of the robotic arm 120 and the 3D model data of the processing environment, and according to the at least one correction point position data, the processing module 110 enables a free end of the robotic arm 120 to move to a corresponding position in the real world coordinate system, and the processing module 110 compares the at least one correction point position data with the corresponding position.

Figure 1C:
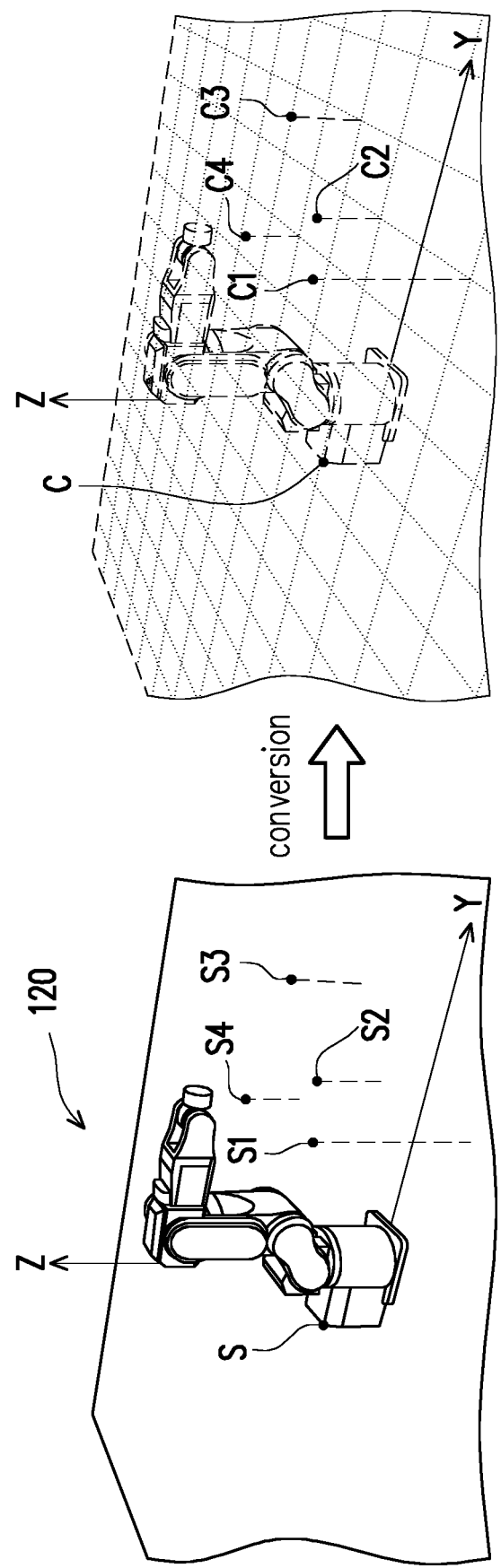
FIG. 1C is a schematic diagram of coordinate conversion between a virtual 3D space and a real world coordinate system.

Referring to FIG. 1C, the left side of FIG. 1C illustrates the robotic arm in the real world and the right side of FIG. 1C illustrates the robotic arm in the virtual 3D space. More specifically, at least one reference point S on the robotic arm in the real world is selected and 3D data of the reference point S is obtained. A comparison point C on the robotic arm in the virtual world, which corresponds to the position of the reference point S, is obtained, and 3D model data of the comparison point C is obtained. Then, the 3D model data of the comparison point C is compared with the 3D data of the reference point S to obtain a conversion coefficient between the real world and the virtual 3D space. With the conversion coefficient, the 3D model data may be converted to the 3D data of the real world, so as to match components in the virtual 3D space to the same components in the real world. Of course, the conversion coefficient may also be used to convert the 3D data of the real world to the 3D model data in the virtual 3D space.

Particularly, the processing posture and moving path of the robotic arm in the virtual 3D space and those of the robotic arm in the real world are further corrected. More specifically, the robotic arm in the real world is operated to move the free end thereof to four reference points S1, S2, S3, and S4 in the real world, and the four reference points S1, S2, S3, and S4 are mapped to the virtual 3D space to form comparison points C1, C2, C3, and C4, so as to obtain 3D model data of the comparison points C1, C2, C3, and C4. As the free end of the robotic arm in the real world moves, the moving posture and path of the free end are recorded. Then, according to the order in which the free end of the robotic arm in the real world moves to the reference points S1, S2, S3, and S4, the free end of the robotic arm in the virtual 3D space is moved to the comparison points C1, C2, C3, and C4, and at the same time, the moving posture and path of the free end of the robotic arm in the virtual 3D space are recorded to be compared with the moving posture and path of the robotic arm in the real world, so as to find the error and correct the error.

Thereafter, the result is sent back to the processing module 110 for the processing module 110 to perform calculation and adjustment, so as to synchronize the processing posture and moving path of the robotic arm in the virtual 3D space with the processing posture and moving path of the robotic arm in the real world. Here, the synchronization mainly means that the free ends of the robotic arms in the real world and the virtual 3D space move along the same path with the same posture, and does not necessarily mean that they perform the same operation at the same time, and they may accomplish the same task at different times. Simply put, the processing procedure is set in the virtual 3D space, and then the processing system in the real world is enabled to perform the processing procedure only at a preset time.

Furthermore, Step S122 may be performed after Step S120, in which the processing module 110 detects at least one contact point feature 192 according to the 3D model data of the workpiece, so as to establish positions of a plurality of contact points 194 and generate a processing path consisting of the contact points 194. When the robotic arm 120 is driven by the processing module 110, the free end of the robotic arm 120 moves along the processing path, as shown in FIG. 1C. It should be noted that the contact points may be arranged at equal or unequal intervals, which may be determined according to the actual needs.

Next, referring to FIG. 1A, FIG. 1B, and FIG. 1C, for example, in Step S130, the processing module 110 generates a moving posture candidate group of the robotic arm 120 according to a relationship according to each one of the contact points 194 corresponding to the free end of the robotic arm 120. The moving posture candidate group refers to robotic arm postures corresponding to all possible paths that the robotic arm 120 may take during the processing to move from one position to another position to perform the processing procedure.

For example, in Step S140, an actual moving posture is selected from the moving posture candidate group. More specifically, the processing module 110 generates a corresponding 3D posture model candidate group of the robotic arm 120 according to the moving posture candidate group, and deletes the moving posture in the moving posture candidate group, with interference between the robotic arm 120 and the environment space according to the moving posture candidate group, the 3D posture model candidate group, and the 3D model data of the processing environment, and then the processing module 110 selects the moving posture that involves the smallest offset of the shaft angle of the robotic arm 120 from the moving posture candidate group with no interference.

More specifically, when the processing module 110 calculates a plurality of moving paths for moving the robotic arm 120 to the processing position, the type, contour, or size of the robotic arm 120 needs to be taken into consideration, and other components disposed in the processing environment need to be considered as well. If these factors are not taken into consideration, the robotic arm 120 may interfere with the components in the processing environment during movement due to the type, contour, and size of the robotic arm 120, and as a result, fail to perform the processing. The robotic arm 120 may even collide with the components in the processing environment and cause damage to the robotic arm 120 or the components.

Therefore, after calculating multiple possible moving paths, the processing module 110 further takes the 3D posture model candidate group related to the shapes, contours, and sizes of the robotic arm 120 and the workpiece 190 and the relationship therebetween into consideration for comparison. In the meantime, because configuration of the components in the processing environment may affect completion of the processing procedure, the processing module 110 also takes the 3D model data of the processing environment into consideration for comparison. After combining and analyzing the moving posture candidate group, the 3D posture model candidate group, and the 3D model data of the processing environment, the processing module 110 deletes the moving posture candidate group that may cause interference and selects the moving posture, which involves the shortest moving distance and the smallest shaft rotation angle of the robotic arm 120, from the remaining moving posture candidate group that does not cause interference with the components in the environment, which not only helps the robotic arm 120 to perform the processing in the most effortless manner but also facilitates completion of the processing procedure.

For example, in Step S150, the processing module 110 moves the free end of the robotic arm 120 to each corresponding one of the contact points 194 according to the actual moving posture. More specifically, after selecting the moving posture that enables the robotic arm 120 to perform the processing in the most effortless manner, the moving posture is converted to the actual moving posture applied in the real world coordinate system with use of the conversion coefficient. Then, the processing module 110 drives the robotic arm 120 to move to the contact point 194 according to the actual moving posture.

For example, in Step S160, the processing module 110 moves the free end of the robotic arm 120 along the processing path according to a plurality of actual moving postures, so as to perform the processing procedure. More specifically, because the moving posture has been converted to the actual moving posture through the conversion coefficient, in the real world, the robotic arm 120 moves along the processing path according to the actual moving path instructed by the processing module 110.

Moreover, by synchronizing the robotic arm in the real world and the robotic arm in the virtual 3D space, as described above, the robotic arm in the real world can reliably perform the processing procedure according to the actual moving posture, so as to prevent the problem that the selected optimal processing path in the virtual 3D space is not identical to the actual moving path of the robotic arm in the real world and results in failure to perform the processing procedure.

Particularly, the workpieces 190 of the same type to be picked up by the robotic arm 120 may be slightly different from one another in appearance and size due to tolerance, or the angle at which the workpiece 190 is placed may cause the workpiece 190 to be misaligned with respect to the robotic arm 120, so the contact points established on each workpiece 190 may not be identical. Therefore, the processing paths that the processing module 110 calculates for the workpieces 190 may not be identical. In a word, every single workpiece 190 will have a processing path of its own.

The robotic arm processing method and system based on 3D image, as described above, make it possible to perform an automated processing procedure, which not only saves manpower but also reduces human errors to improve the assembly yield.

Second Embodiment

Figure 3:
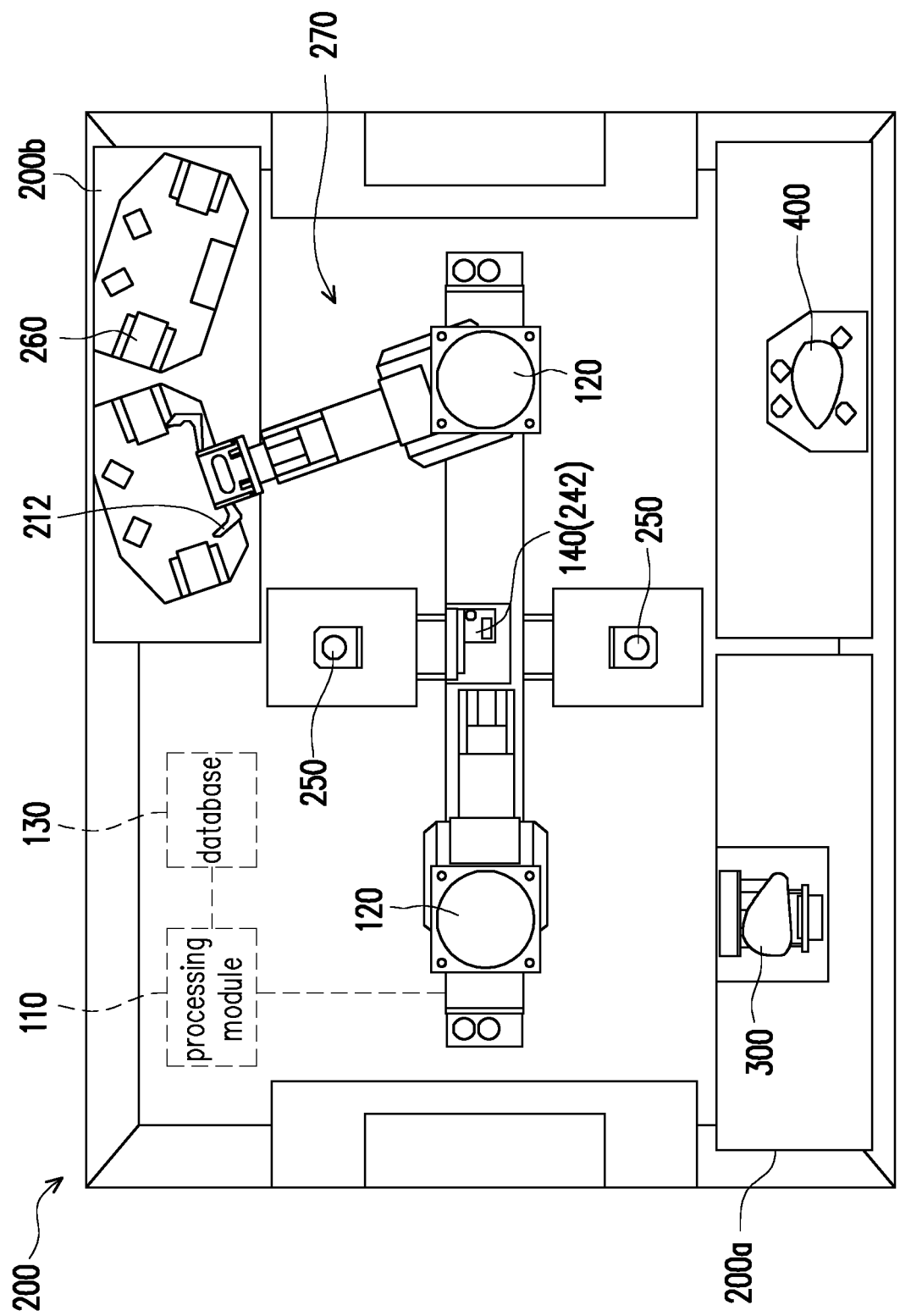
FIG. 3 is a schematic diagram of a dispensing processing apparatus according to the second embodiment.
Figure 4:
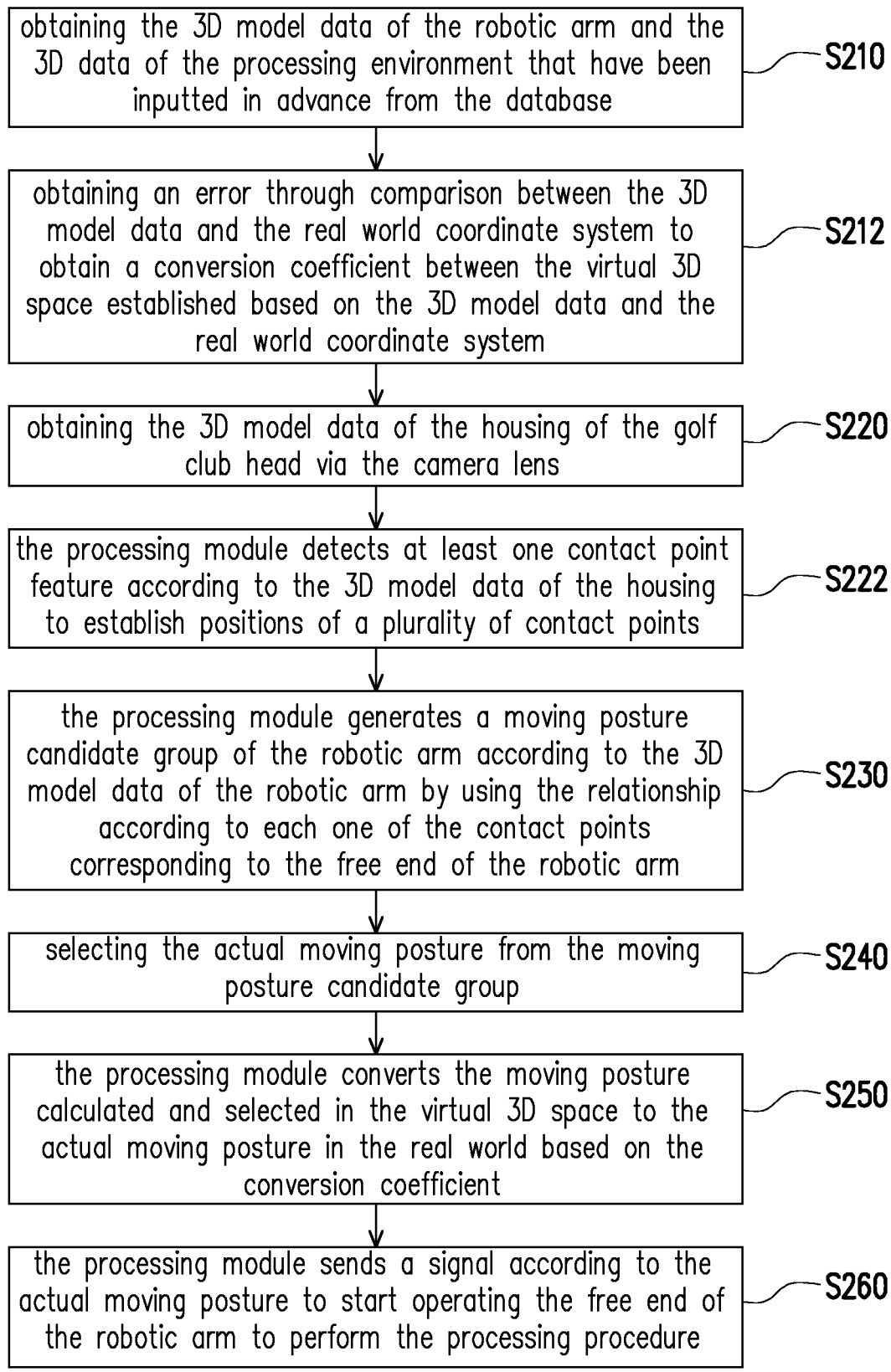
FIG. 4 is a flowchart of a processing method of the dispensing processing apparatus.
Figure 5:
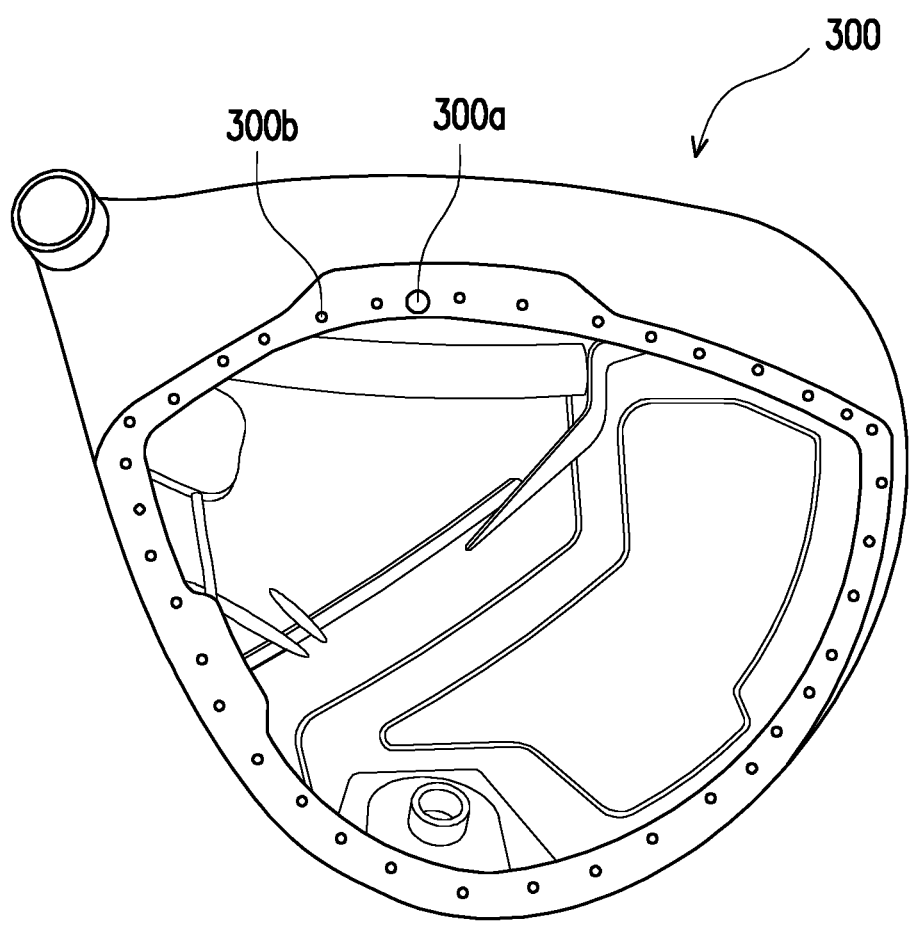
FIG. 5 is a schematic diagram of a housing of a golf club head in a virtual 3D space.

FIG. 3 is a schematic diagram of a dispensing processing apparatus according to the second embodiment. FIG. 4 is a flowchart of the dispensing processing apparatus processing a housing of a golf club head. FIG. 5 is a schematic diagram of the housing of the golf club head in the virtual 3D space.

Referring to FIG. 3, FIG. 4, and FIG. 5, a dispensing processing apparatus 200 includes a processing module 110, a robotic arm 120, a database 130, a non-contact type detection device 140, and a dispensing device 250. The robotic arm 120 is adapted to perform a processing procedure on a housing 300 of the golf club head in a processing environment 270 provided by the dispensing processing apparatus 200. The database 130 is adapted to store 3D model data of the dispensing processing apparatus 200, the processing environment 270, and the housing 300 of the golf club head. The processing module 110 is electrically coupled between the robotic arm 120 and the database 130 for controlling the robotic arm 120 to execute the processing procedure. The non-contact type detection device 140 is a camera lens 242, for example, which is electrically coupled to the processing module 110 and the database 130 to detect the contour and size of the housing 300, so as to generate the 3D model data of the housing 300. The dispensing device 250 may be located according to the actual needs. In this embodiment, the dispensing device 250 is disposed at a fixed position in the processing environment 270 and the free end of the robotic arm 120 connects a holding device 212, and the holding device 212 is used to hold the housing 300, such that the robotic arm 120 moves the housing 300 along the processing path for the dispensing device 250 to dispense adhesive on every contact point 300b of the housing 300. In another embodiment not shown here, the dispensing device 250 may be disposed on the free end of the robotic arm 120 and the housing 300 of the golf club head is fixed, so as to use the robotic arm 120 to dispense adhesive on every contact point 300b along the processing path.

The dispensing processing apparatus 200 further includes a bonding device 260 that is located in the processing environment 270 and disposed close to the robotic arm 120 for providing a pressure to bond the housing 300 of the golf club head to another housing 400 of the golf club head, wherein the adhesive has been applied to at least one of the two housings 300 and 400 of the golf club head. The bonding device 260 may be a pneumatic cylinder, but not limited thereto.

In addition, the dispensing processing apparatus 200 further includes a preparation region 200a and a stocking region 200b, and the robotic arm 120 is adapted to move between the preparation region 200a and the stocking region 200b, wherein the preparation region 200a is for placing the housing 300 of the golf club head that is to be processed, and the stocking region 200b is for placing the two housings 300 and 400 of the golf club head that have been bonded.

When the dispensing processing apparatus 200 is used to perform an automatic dispensing procedure on the housing 300 of the golf club head, for example, in Step S210, the 3D model data of the robotic arm 120 and the 3D data of the processing environment 270 that have been inputted in advance are obtained from the database 130. The 3D model data of the robotic arm 120 includes the number of the shafts that constitute the robotic arm 120, rotation angles of the shafts, moving direction and distance of the robotic arm 120, and so on. The 3D data of the processing environment 270 includes other possible components or devices in addition to the non-contact type detection device 140 (the camera lens 242) and the dispensing device 250 described above. The other components or devices may be components that constitute the dispensing processing apparatus 200 or devices for the dispensing processing apparatus 200 to perform other processes.

For example, in Step S212, an error is obtained through comparison between the 3D model data and the real world coordinate system, so as to obtain a conversion coefficient between the virtual 3D space established based on the 3D model data and the real world coordinate system. With the conversion coefficient, the 3D model of the robotic arm 120 and the 3D model data of the processing environment 270 correctly correspond to the robotic arias 120 and the processing environment 270 in the real world, so as to correct the error between the 3D model data of the robotic arm 120 and the real world coordinate system and the error between the 3D model data of the processing environment 270 and the real world coordinate system. Although the above is based on the case where the 3D model of the robotic arm 120 and the 3D model data of the processing environment 270 correctly correspond to the robotic arm 120 and the processing environment 270 in the real world, those skilled in the art should know that the robotic arm 120 and the processing environment 270 in the real world may also be projected to the virtual 3D space by using the conversion coefficient. In a word, the conversion coefficient is used to make the coordinates in the real world match the model data of the virtual 3D world, and the model data in the virtual 3D space may also be applied to the coordinates in the real world.

In addition, movement of the robotic arm 120 in the real world and movement of the robotic arm in the virtual 3D space are further corrected, so as to synchronize the movement of the robotic arm 120 in the real world with the movement of the robotic arm in the virtual 3D space. Here, the synchronization mainly means that the free ends of the robotic arms in the real world and the virtual 3D space move along the same path with the same posture, and does not necessarily mean that they perform the same operation at the same time, and they may accomplish the same task at different times.

For example, in Step S220, the 3D model data of the housing 300 of the golf club head is obtained via the camera lens 242. More specifically, the camera lens 242 is disposed in a central region of the dispensing processing apparatus 200. Thus, in the actual operation, the robotic arm 120 first acquires the housing 300 and then moves to a position close to the camera lens 242 for the camera lens 242 to capture an image, so as to obtain the 3D model data of the housing 300.

The 3D model data of the housing 300 of the golf club head includes information such as the contour, shape, and size of the housing 300 of the golf club head, whether the surface to be processed is a flat or curved surface, and other physical features. In another embodiment, the 3D model data of the housing 300 of the golf club head may be built in the database 130, and the processing module 110 may directly access the 3D model data of the housing 300 built in the database 130. Alternatively, the image of the housing 300 may be used in combination with a preset 3D model image of the housing 300 in the database to generate the final 3D model data of the housing 300.

The method of building the 3D model data of the housing 300 in the database 130, as described above, is based on the assumption that the housings 300 of the same type are identical to one another and are not subject to tolerance. However, in the actual manufacturing processes, the housings 300 of the same type may be somewhat different from one another due to tolerance. Thus, using the camera lens 242 to capture the image of every housing 300 that is about to enter the preparation region 200a makes it possible to instantly identify the feature of each housing 300 of the same type, which facilitates optimization of the design of the processing path.

Moreover, the camera lens 242 of this embodiment is disposed on the path, along which the housing 300 of the golf club head moves from the preparation region 200a to the stocking region 200b. However, the camera lens 242 may also be disposed at other suitable positions in the dispensing processing apparatus 200 according to the actual needs for the robotic arm 120 to hold and move the housing 300 to the position of the camera lens 242 for imaging.

For example, in Step S222, the processing module 110 detects at least one contact point feature 300a according to the 3D model data of the housing 300 to establish positions of a plurality of contact points 300b. More specifically, the contact point feature 300a may be a single feature that is manually set, such as a certain depression point, protrusion point, or edge reference point of the housing 300, or multiple contact point features 300a may be built in the database 130 for the processing module 110 to select one randomly as reference. Thereafter, the processing module 110 selects a plurality of positions on the surface to be processed according to the selected contact point feature 300a to serve as other contact points 300b. In other embodiments, the user may set a plurality of contact points 300 by themselves to form a preset processing path.

It should be noted that although the workpiece to be processed in this embodiment is the housing 300 of the golf club head, the type of the workpiece is not limited thereto. The type of the workpiece to be processed may also be determined according to the image captured by the camera lens 242 in combination with the contact point feature 300a detected, such that the processing module 110 may find corresponding data in the database 130 according to the identification result to perform the corresponding processing procedure.

Further, referring to FIG. 3, FIG. 4, and FIG. 5, when the robotic arm 120 holds the housing 300 placed in the preparation region 200a with the holding device 212 connected to the free end of the robotic arm 120, due to production tolerance, position, or angle of placing the housing 300, the holding device 212 may hold each housing 300 differently. Thus, for example, in Step S230, the processing module 110 may generate a moving posture candidate group of the robotic arm 120 according to the 3D model data of the robotic arm 120 by using the relationship according to each one of the contact points 300b corresponding to the free end of the robotic arm 120.

More specifically, after capturing an image via the camera lens 242, the processing module 110 may calculate to determine whether there may be a distance offset or angle deviation between a certain end point of the free end of the robotic arm 120 and the corresponding contact point 300b, and further calculate the offset distance and the deviation angle and change the posture of the robotic arm 120 for compensation. The posture includes a moving distance of the robotic arm 120 with respect to a certain reference point, an angle between shafts of the robotic arm 120, a relative rotation angle between two shafts, an angle and a rotation angle of the holding device 212 with respect to the shaft, and so on. Thus, the data of the moving posture candidate group includes a distance compensation of the robotic arm 120 with respect to a certain reference point, an angle compensation, a processing angle when the robotic arm 120 moves the housing 300 to the dispensing device 250, all possible moving postures and processing paths for the robotic arm 120 to move from one point to another point, and so on.

For example, in Step S240, the actual moving posture is selected from the moving posture candidate group. Simply put, the optimal posture (the actual moving posture) that involves the shortest moving distance of the robotic atm 120 and the smallest rotation angle of each shaft of the robotic arm 120 is selected among all the possible moving postures.

More specifically, the processing module 110 generates a corresponding 3D posture model candidate group of the robotic arm 120 according to the moving posture candidate group, wherein the 3D posture model candidate group includes an optimized angle of the housing 300 with respect to the dispensing device 250 during adhesive dispensation and an optimized posture of the robotic arm 120 calculated by the processing module 110. Moreover, the processing module 110 also takes the moving posture candidate group, the 3D posture model candidate group, and the 3D model data of the processing environment 270 into consideration to calculate and determine whether the moving path of the moving posture candidate group causes interference with other components in the processing environment 270, and delete the moving posture in the moving posture candidate group with interference between the robotic arm 120 and the environment, and then select the moving posture that involves the shortest moving distance of the robotic arm 120 and the smallest offset of the shaft angle from the moving posture candidate group that does not cause interference.

For example, in Step S250, the processing module 110 converts the moving posture calculated and selected in the virtual 3D space to the actual moving posture in the real world based on the conversion coefficient, and this posture includes the processing moving path and the shaft rotation angle of the robotic arm 120.

It should be noted that due to influence of the production tolerance of every single housing 300, the housings 300 may be at different positions or angles after entering the preparation region 200a. Therefore, the angle at which the holding device 212 connected to the free end of the robotic arm 120 holds the housing 300 may need to be changed, too. Thus, the actual moving postures for different housings 300 may differ. In other words, in the processing procedures of all the housings 300, the processing paths for the housings 300 may not be identical and may differ slightly.

For example, in Step S260, the processing module 110 sends a signal according to the actual moving posture to start operating the free end of the robotic arm 120. After the holding device 212 connected to the free end holds the housing 300, the free end of the robotic arm 120 moves along the processing path according to the actual moving posture and approaches the dispensing device 250 at the optimal angle for adhesive dispensation. After the adhesive dispensation is completed, the robotic arm 120 bonds the housing 300 to the other auxiliary housing 400 and then places the bonded housings 300 and 400 in the stocking region 200b. Furthermore, the bonding device 260 disposed in the stocking region 200b applies a pressure on the bonded two housings 300 and 400, so as to bond the two housings 300 and 400 close to each other to form the golf club head.

It should be noted that, by synchronizing the robotic arm 120 in the real world and the robotic arm in the virtual 3D space, as described above, the robotic arm 120 in the real world can reliably perform the processing procedure according to the actual moving posture, so as to prevent the problem that the selected optimal processing path in the virtual 3D space is not identical to the actual moving path of the robotic arm 120 in the real world and results in failure to perform the processing procedure.

Accordingly, the processing procedure is completed. Then, the golf club head may be taken from the stocking region 200b manually or by a robot.

Third Embodiment

Figure 6:
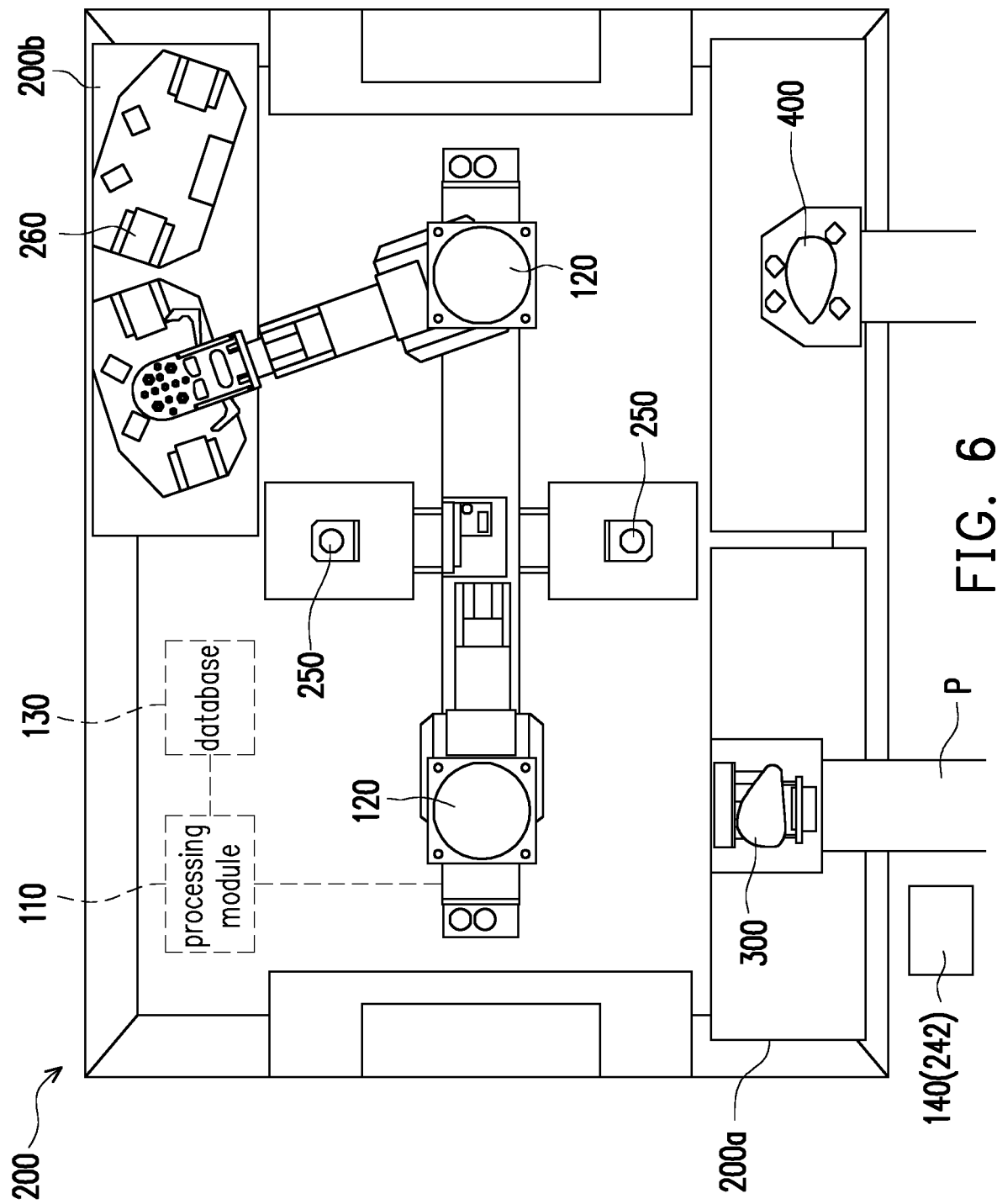
FIG. 6 is a schematic diagram of another embodiment of the dispensing processing apparatus.

This embodiment is generally the same as the second embodiment, and the only difference specified in the third embodiment as shown in FIG. 6 is that, the housing 300 of the golf club head may be sent to the preparation region 200a by a conveyor belt P, and the camera lens 242 may be disposed in the delivery route of the conveyor belt P before the preparation region 200a, so as to capture an image of the housing 300 of the golf club head before the housing 300 enters the preparation region 200a. Then, the housing 300 of the golf club head is processed and converted to 3D model data by image processing.

The rest of the steps for obtaining the 3D model data of the housing 300 to be processed are the same as those specified in the previous embodiment and thus are not repeated hereinafter.

Although this embodiment is slightly different from the second embodiment in terms of the system structure and order of the steps, it does not go beyond the scope of the robotic arm processing method and system based on 3D image of the invention.

To sum up, in the robotic arm processing method and system based on 3D image of the invention, model construction is performed in the virtual 3D space, and the virtual 3D space and the real world are connected through correction, such that the processing module may calculate and select the optimized processing path and the robotic arm may have functions of automatic judgment and learning. Moreover, the processing does not require manpower and thus can save manpower. Furthermore, with the automatic learning function, angular or distance offset may be corrected instantly to improve the assembly yield of the workpiece.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A robotic arm processing method based on a 3D image, by which a robotic arm performs a processing procedure on at least one workpiece in a processing environment, the robotic arm processing method comprising:
   providing 3D model data of the robotic arm and 3D model data of the processing environment;
   obtaining 3D model data of the workpiece, and generating a processing path consisting of a plurality of contact points according to the 3D model data of the workpiece, wherein a free end of the robotic arm moves along the processing path to perform the processing procedure;
   generating a moving posture candidate group of the robotic arm according to a relationship according to each one of the contact points corresponding to the free end of the robotic arm;
   selecting an actual moving posture from the moving posture candidate group;
   moving the free end of the robotic arm to each corresponding one of the contact points according to the actual moving posture; and
   moving the free end of the robotic arm along the processing path according to a plurality of the actual moving postures to perform the processing procedure.

2. The robotic arm processing method according to claim 1, further comprising:
   correcting an error between the 3D model data of the robotic arm and the 3D model data of the processing environment in a real world coordinate system.

3. The robotic arm processing method according to claim 2, wherein correcting comprises:
   selecting at least one correction point position data from the 3D model data of the robotic arm and the 3D model data of the processing environment;
   enabling the free end of the robotic arm to move to a corresponding position in the real world coordinate system according to the at least one correction point position data; and
   comparing the at least one correction point position data with the corresponding position.

4. The robotic arm processing method according to claim 1, wherein obtaining the 3D model data of the workpiece comprises:
   obtaining preset 3D model data of the workpiece via a database, or detecting a contour and a size of the workpiece via a non-contact type detection device to generate the 3D model data of the workpiece.

5. The robotic arm processing method according to claim 1, wherein generating the processing path consisting of the contact points comprises:
   setting a plurality of positions of the contact points according to the 3D model data of the workpiece to form the processing path.

6. The robotic arm processing method according to claim 1, wherein generating the processing path consisting of the contact points comprises:
   detecting at least one contact point feature according to the 3D model data of the workpiece to establish a plurality of positions of the contact points.

7. The robotic arm processing method according to claim 1, wherein selecting the actual moving posture from the moving posture candidate group comprises:
   generating a 3D posture model candidate group of the robotic arm according to the moving posture candidate group; and
   deleting a moving posture, in the moving posture candidate group, with interference between the robotic arm and the processing environment according to the moving posture candidate group, the 3D posture model candidate group, and the 3D model data of the processing environment.

8. The robotic arm processing method according to claim 7, wherein selecting the actual moving posture from the moving posture candidate group comprises:
   selecting a moving posture that involves a smallest offset of a shaft angle of the robotic arm from the moving posture candidate group with no interference.

9. The robotic arm processing method according to claim 1, wherein the processing procedure comprises a dispensing processing procedure, wherein the free end of the robotic arm connects a dispensing device for the robotic arm to dispense an adhesive on each of the contact points on the processing path.

10. The robotic arm processing method according to claim 1, wherein the processing procedure comprises a dispensing processing procedure, wherein the free end of the robotic arm connects a holding device to hold and move the workpiece for the robotic arm to dispense an adhesive on each of the contact points on the processing path via a dispensing device at a fixed position.

11. The robotic arm processing method according to claim 9, further comprising:
bonding the workpiece with the adhesive to an auxiliary workpiece via a bonding device.

12. A robotic arm processing system based on a 3D image, comprising:
a robotic arm performing a processing procedure to at least one workpiece in a processing environment;
a database storing 3D model data of the workpiece, 3D model data of the robotic arm, and 3D model data of the processing environment; and
a processing module coupled between the robotic arm and the database to control the robotic arm to execute the processing procedure,
wherein the processing module generates a processing path consisting of a plurality of contact points according to the 3D model data of the workpiece, and controls a free end of the robotic arm to move along the processing path to perform the processing procedure;
wherein the processing module generates a moving posture candidate group of the robotic arm according to a relationship according to each one of the contact points corresponding to the free end of the robotic arm, and selects an actual moving posture from the moving posture candidate group;
wherein the processing module controls the free end of the robotic arm to move to each corresponding one of the contact points according to the actual moving posture; and
wherein the processing module controls the free end of the robotic arm to move along the processing path according to a plurality of the actual moving postures to perform the processing procedure.

13. The robotic arm processing system according to claim 12, wherein the processing module corrects an error between the 3D model data of the robotic arm and a real world coordinate system and an error between the 3D model data of the processing environment and the real world coordinate system.

14. The robotic arm processing system according to claim 13, wherein the processing module selects at least one correction point position data from the 3D model data of the robotic arm and the 3D model data of the processing environment;
wherein the processing module enables the free end of the robotic arm to move to a corresponding position in the real world coordinate system according to the at least one correction point position data; and
wherein the processing module compares the at least one correction point position data with the corresponding position.

15. The robotic arm processing system according to claim 12, wherein the processing module obtains preset 3D model data of the workpiece via the database.

16. The robotic arm processing system according to claim 12, further comprising a non-contact type detection device coupled between the processing module and the database to detect a contour and a size of the workpiece to generate the 3D model data of the workpiece.

17. The robotic arm processing system according to claim 12, wherein the processing module sets a plurality of positions of the contact points according to the 3D model data of the workpiece to form the processing path.

18. The robotic arm processing system according to claim 12, wherein the processing module detects at least one contact point feature according to the 3D model data of the workpiece to establish a plurality of positions of the contact points.

19. The robotic arm processing system according to claim 12, wherein the processing module generates a 3D posture model candidate group of the robotic arm according to the moving posture candidate group; and
wherein the processing module deletes a moving posture, in the moving posture candidate group, with interference between the robotic arm and the processing environment from the moving posture candidate group according to the moving posture candidate group, the 3D posture model candidate group, and the 3D model data of the processing environment.

20. The robotic arm processing system according to claim 19, wherein the processing module selects a moving posture that involves a smallest offset of a shaft angle of the robotic arm from the moving posture candidate group with no interference.

21. The robotic arm processing system according to claim 12, wherein the free end of the robotic arm connects a dispensing device for the robotic arm to dispense an adhesive on each of the contact points on the processing path.

22. The robotic arm processing system according to claim 12, wherein the free end of the robotic arm connects a holding device to hold and move the workpiece for the robotic arm to dispense an adhesive on each of the contact points on the processing path via a dispensing device at a fixed position.

23. The robotic arm processing system according to claim 21, further comprising:
a bonding device located in the processing environment and close to the robotic arm to bond the workpiece with the adhesive to an auxiliary workpiece.

* * * * *